United States Patent

Schwendinger et al.

[11] Patent Number: 5,993,609
[45] Date of Patent: Nov. 30, 1999

[54] PROCESS FOR THE PURIFICATION OF PHOSPHORUS OXYCHLORIDE

[75] Inventors: Karl Schwendinger, Linz; Engelbert Kloimstein, Eferding, both of Austria

[73] Assignee: DSM Fine Chemicals Austria GmbH, Austria

[21] Appl. No.: 09/145,640

[22] Filed: Sep. 2, 1998

[30] Foreign Application Priority Data

Sep. 3, 1997 [AT] Austria ..................................... 1471/97

[51] Int. Cl.$^6$ .............................. B01D 3/34; C01B 25/10
[52] U.S. Cl. ................................ 203/38; 203/59; 203/84; 203/DIG. 11; 423/300
[58] Field of Search ................................ 203/38, 59, 73, 203/84, DIG. 11, 29; 544/330; 423/300

[56] References Cited

U.S. PATENT DOCUMENTS

| | | | |
|---|---|---|---|
| 3,963,585 | 6/1976 | Winter et al. | 203/38 |
| 3,983,011 | 9/1976 | Wiggill | 203/59 |
| 4,865,696 | 9/1989 | McLaughlin et al. | 203/29 |
| 4,929,729 | 5/1990 | Haga et al. | 544/330 |
| 5,464,600 | 11/1995 | Newallis et al. | 423/300 |

*Primary Examiner*—Virginia Manoharan
*Attorney, Agent, or Firm*—Wenderoth, Lind & Ponack, L.L.P.

[57] ABSTRACT

A process for the purification of recovered or regenerated phosphorus oxychloride contaminated by reactive organic compounds, by reacting the contaminated phosphorus oxychloride with from 0.1 to 5% by weight of an organic amine, having 1 or 2 tertiary N-atoms and a boiling point above the boiling point of phosphorus oxychloride, at the boiling temperature of the reaction mixture and subsequently carrying out fractional distillation at atmospheric pressure to obtain purified phosphorus oxychloride.

8 Claims, No Drawings

PROCESS FOR THE PURIFICATION OF PHOSPHORUS OXYCHLORIDE

Phosphorus oxychloride is prepared industrially from phosphorus trichloride by oxidation with atmospheric oxygen. This process produces a very pure product which is virtually uncontaminated with organic substances.

Chlorination processes for the preparation of chlorinated heterocycles, preferably of nitrogen heterocycles, from hydroxy compounds using phosphorus oxychloride and subsequent or simultaneous $POCl_3$ regeneration using $PCl_5$, which can also be formed in situ from $PCl_3$ and chlorine during the chlorination reaction, have become known in recent years.

The $POCl_3$ recovered by distillation is in most cases contaminated with organic, mostly chlorinated, compounds which impede recycle or render it impossible. The causes are organic substances whose boiling point is similar to that of $POCl_3$, making removal of undesired substances which are present in the order of ppm by distillation difficult or completely impossible. The object of the invention was to effectively remove these substances, some of which are very reactive, from phosphorus oxychloride.

Surprisingly, this object was achieved by adding organic tertiary amines such as trialkylamines, pyridines and anilines.

Accordingly, the present invention provides a process for the purification of recovered or regenerated phosphorus oxychloride contaminated with reactive organic compounds, which comprises reacting the contaminated phosphorus oxychloride with from 0.1 to 5% by weight of an organic amine, having 1 or 2 tertiary N-atoms and a boiling point above the boiling point of phosphorus oxychloride, at the boiling temperature of the reaction mixture and subsequently carrying out fractional distillation at atmospheric pressure to obtain pure phosphorus oxychloride.

In the novel process, phosphorus oxychloride ($POCl_3$), which is recovered or regenerated after chlorination reactions, is purified by removing reactive organic compounds. In this context, chlorination reactions are taken to mean processes for the preparation of chlorinated heterocycles, in particular of chlorinated nitrogen heterocycles, such as, for example, chloropyrimidines.

In this context, examples of undesired contaminants are various carbonyl chlorides, such as mono-, di- and trichlorocarboxylic acids, and also carbonitriles.

The novel process is particularly suitable for removing $C_2$–$C_4$-carboxylic acid derivatives, in particular acetic acid derivatives, which originate from various feed products or from contaminants within the latter. The undesired contaminants are removed by adding organic amines having 1 or 2 tertiary N-atoms to the $POCl_3$ to be purified. Suitable amines having 1 or 2 tertiary N-atoms are those with a higher boiling point than $POCl_3$. Their boiling point is preferably above 150° C., particularly preferably above 200° C. Examples of suitable amines are trialkylamines having from 4 to 12 carbon atoms in the alkyl moieties. The alkyl moieties can be identical or different, and linear or branched. Preference is given to trialkylamines having from 4 to 8 carbon atoms in the alkyl moiety, the alkyl moieties in turn preferably being identical.

Accordingly, examples of suitable trialkylamines are n-tributylamine, n-trihexylamine, n-trioctylamine, n-tridecylamine, etc.

Other amines which can be used in the novel process are pyridines which have from one to three substituents. Examples of suitable substituents are $C_1$ to $C_4$-alkyl groups, aryl groups or chlorine. Examples of suitable pyridines are 2-, 3- or 4-methylpyridine, 2,4-dimethylpyridine, 2,4,6-trimethylpyridine, 5-ethyl-2-methylpyridine, etc. Pyridines which may be substituted by aryl groups are, for example, 2-phenylpyridine et al., but also benzofused ring systems, such as quinoline or isoquinoline.

Other suitable tertiary amines are N,N-substituted anilines or toluidines, such as N,N-di-$C_1$–$C_4$-alkylanilines or -toluidines, for example N,N-dimethylaniline etc.

The amount of amine added is determined by the amount of contaminants present. Preference is given to using from 0.1 to 5% by weight of amine, based on $POCl_3$. Particular preference is given to adding from 0.2 to 2% by weight of amine. After the amine has been added, the resulting reaction mixture is heated to the reflux temperature and allowed to react at this temperature for from about 10 to 60 minutes. The purified $POCl_3$ is then isolated from the reaction mixture by fractional distillation. For this purpose, preference is given to using a distillation column having 5–10 theoretical plates. In the first phase of the distillation the reflux ratio of take-off:reflux is preferably adjusted to from 1:1 to 1:4, particularly preferably from 1:2 to 1:3, and the readily volatile compounds are removed first. When the head of the column reaches the boiling point of pure $POCl_3$, then pure $POCl_3$ is removed at a reflux ratio of take-off:reflux of from 1:1 to 4:1, preferably up to 3:1.

The distillation residue can remain in the distillation flask and, together with the next batch or with the collected initial fractions, be subjected to another distillation.

The purified $POCl_3$ obtained by the novel process satisfies the important criteria for reuse, which are tested by measuring the solidification point (>0.8° C.), the organic carbon content (TOC <200 ppm), the content of Fe, Cr, Ni (<5 ppm), and by color tests with pyridine and gas chromatographic investigations.

EXAMPLE 1

5.0 g of n-tributylamine were added to 500 ml of phosphorus oxychloride containing 400 ppm of TOC (recovered from a chlorination reaction for the preparation of 4,6-dichloropyrimidine) in a 1 l flask fitted with thermometer, heating mantle, a 1 m column packed with 3 mm Raschig rings and filled with reflux divider, thermometer and reflux condenser, and the mixture was heated to the reflux temperature. After total reflux for 30 minutes, the temperature at the head of the column was 101.8° C. A reflux ratio of 1:3 was then set. After 10 ml of distillate had been removed, the temperature was 103.1° C., and after 25 ml, 105.3° C.; the head temperature then remained constant at this temperature. After 40 ml of distillate had collected after a distillation time of 20 min., the distillation was switched over to the main fraction, and the reflux ratio was adjusted to 3:1. After a distillation time of 80 min. and a constant head temperature of 105.3° C., 420 ml of main fraction had been removed. The product was colorless, contained 50 ppm of TOC and no heavy metals in the ppm range, and the solidification point was 1.1°. A further 500 ml of $POCl_3$ were added to the black liquid residue, and distillation was carried out as described previously. As well as an initial fraction of 40 ml, another 420 ml of main fraction were again removed, which again corresponded to the specification requirements. 60 ppm of TOC were found. 500 ml of fresh $POCl_3$ were then added and the distillation was carried out again. The 420 ml main fraction contained 100 ppm of TOC and, in the pyridine test, was on the borderline as regards coloration. All other criteria were in order. After a further 500 ml of $POCl_3$ had been added and distillation carried out, 480 ml of distillate were removed as main fraction, which contained 110 ppm of TOC but no longer satisfied the pyridine test. The test series was stopped with the following results:

Using 2000 ml of $POCl_3$ obtained from chlorination reactions
160 ml of initial fraction=8%
1740 ml of main fraction=87%
100 ml of reflux=5%

The use of 5 g of tributylamine gave 1260 ml or 2100 g of pure $POCl_3$, which corresponds to a tributylamine consumption of 0.24%, based on pure $POCl_3$, or 0.2%, based on contaminated $POCl_3$ used.

EXAMPLE 2

25 g of trioctylamine were added to 1500 ml of recovered $POCl_3$ which contained 400 ppm of TOC and did not correspond to the specification requirements in a 2 l flask fitted with column and reflux divider, as described in Example 1, and then the mixture was worked up by distillation as described in Example 1. After refluxing for half an hour the head temperature remained constant at 99.8° C. After 55 ml of distillate had been removed at a reflux ratio of 1:3, the head temperature adjusted to 105.4° C., and after a further 50 ml of distillate, the temperature remained constant at 105.7° C. 27 minutes were required to distil off the 105 ml of initial fraction. The distillation was then switched over to the main fraction, at a reflux ratio of 3:1, and 1300 ml of distillate (2×500 ml, 1×200 ml, 1×100 ml) were removed. The head temperature remained constant at 105.7° C. The total 1300 ml of main fractions satisfied the purity requirements.

A further 1500 ml of contaminated $POCl_3$ were added to the residual bottom product and the distillation operation was repeated. After 110 ml of initial fraction, 1370 ml of main fraction were removed, which satisfied all specification requirements 3000 ml of crude $POCl_3$ gave 215 ml of initial fraction, corresponding to 7.2%, and 2670 ml of pure product, corresponding to an 89% yield.

EXAMPLE 3

2 g of 5-ethyl-2-methylpyridine were added to 200 g of contaminated $POCl_3$ and subjected to fractional distillation over a column. This gave 17 g (8.5%) of initial fraction and 160 g (80%) of main fraction which satisfied all specification requirements.

EXAMPLE 4

A 2.5 $m^3$ enamel vessel with steam heating having the design as described in Example 1 with equivalent separation efficiency of the glass column was charged with 2500 kg of $POCl_3$ containing 400 ppm of TOC from a chlorination process, and 20 l of n-tributylamine were added, after which the mixture was refluxed for 30 minutes; then, at a reflux ratio of 1:3 until a constant boiling point was reached at the head of the column, 150 kg of initial fraction were removed; subsequently, the distillation was switched over to the main fraction and 1700 kg of $POCl_3$ were distilled off at a reflux ratio of 3:1. The distillation was stopped, and 1850 kg of contaminated $POCl_3$ obtained from the chlorination process were subsequently charged to the vessel and 15 l of n-tributylamine were added, then distillation was again carried out as described previously, to again give 150 kg of initial fraction and 1470 kg of pure distillate. A further 4 subsequent charging operations of a total of 7380 kg of $POCl_3$ and 60 l of n-tributylamine were carried out. 11 630 kg of crude $POCl_3$ gave 9.9 t of pure $POCl_3$ which satisfies the specification, approximately 0.9 t of initial fraction, which was reintroduced into the chlorination process, and 760 kg of distillation residue, which still comprises approximately 70% of $POCl_3$ which can be worked-up by distillation. The total amount of recovered and reusable $POCl_3$ was thus approximately 11 430 kg, i.e. 97.4% of the amount of $POCl_3$ used.

EXAMPLE 5

In a distillation apparatus as described in Example 1, 440 ml or 660 g of distillation residue from the distillation described in Example 4 were introduced into a 1 l flask, and 280 ml of pure $POCl_3$ were recovered up to the boiling point of the reaction mixture of 118° C. at a reflux ratio of 2:1. The black residue which remains and is of high viscosity at room temperature can be disposed of by combustion in a suitable plant.

We claim:

1. A process for the purification of recovered or regenerated phosphorus oxychloride contaminated by reactive organic compounds, which comprises reacting the contaminated phosphorus oxychloride with from 0.1 to 5% by weight of an organic amine, having 1 or 2 tertiary N-atoms and a boiling point above the boiling point of phosphorus oxychloride, at the boiling temperature of the reaction mixture and subsequently carrying out fractional distillation at atmospheric pressure to obtain purified phosphorus oxychloride.

2. The process as claimed in claim 1, wherein from 0.2 to 2% by weight of amine, based on phosphorus oxychloride, are added.

3. The process as claimed in claim 1, wherein tertiary amines having a boiling point above 150° C. are used.

4. The process as claimed in claim 1, wherein the amines used are trialkylamines having from 4 to 12 carbon atoms in the alkyl moieties, pyridines having from one to three $C_1$–$C_4$-alkyl, aryl or chlorine substituents, or N,N-di-$C_1$–$C_4$-alkylanilines or -toluidines.

5. The process as claimed in claim 2, wherein the amines used are trialkylamines having from 4 to 8 carbon atoms in the alkyl moiety.

6. The process as claimed in claim 1, wherein the fractional distillation is carried out in a distillation column having from 5 to 10 theoretical plates.

7. The process as claimed in claim 1, wherein the fractional distillation is performed in a distillation column having a head at an upper portion thereof, and wherein, during the fractional distillation, until the boiling point of purified phosphorus oxychloride is reached at the head of the distillation column, a reflux ratio of take-off:reflux of from 1:1 to 1:4 is set and, subsequently, the purified phosphorus oxychloride is removed at a reflux ratio of take-off:reflux of from 1:1 to 4:1.

8. The process as claimed in claim 1, wherein the distillation is performed in a distillation column having a flask at a bottom portion thereof, and wherein the distillation residue remains in the flask and, together with a subsequent batch or a collection of initial fractions from subsequent batches, is subjected to a further fractional distillation.

* * * * *